US008250217B2

(12) United States Patent
Kidachi et al.

(10) Patent No.: US 8,250,217 B2
(45) Date of Patent: *Aug. 21, 2012

(54) SYSTEM AND METHOD FOR HANDLING SESSION MANAGEMENT IN A COMMUNICATION SYSTEM

(75) Inventors: Takaaki Kidachi, Kawasaki (JP); Tatuhiro Furuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 40 days.

This patent is subject to a terminal disclaimer.

(21) Appl. No.: 12/726,965

(22) Filed: Mar. 18, 2010

(65) Prior Publication Data

US 2010/0191849 A1 Jul. 29, 2010

Related U.S. Application Data

(63) Continuation of application No. PCT/JP2007/068062, filed on Sep. 18, 2007.

(51) Int. Cl.
*G06F 15/16* (2006.01)
(52) U.S. Cl. .......................... 709/227; 709/226
(58) Field of Classification Search .................. 709/217, 709/218, 219, 223, 224, 225, 226, 227, 228, 709/229; 711/126; 725/123; 370/395.21
See application file for complete search history.

(56) References Cited

U.S. PATENT DOCUMENTS

| 2004/0215746 A1* | 10/2004 | McCanne et al. ............. 709/219 |
| 2005/0060414 A1* | 3/2005 | Phillips et al. ................ 709/227 |
| 2005/0078611 A1* | 4/2005 | Adams et al. .................. 370/254 |
| 2005/0117586 A1* | 6/2005 | Ikeda et al. .............. 370/395.21 |
| 2005/0138186 A1* | 6/2005 | Hesselink et al. ............ 709/229 |
| 2005/0198285 A1* | 9/2005 | Petit ............................... 709/225 |
| 2006/0112174 A1* | 5/2006 | L'Heureux et al. ........... 709/223 |
| 2006/0165059 A1 | 7/2006 | Batni et al. |
| 2006/0168128 A1* | 7/2006 | Sistla et al. ................... 709/219 |
| 2006/0218291 A1* | 9/2006 | Zhu et al. ...................... 709/229 |
| 2006/0253888 A1* | 11/2006 | Senga et al. .................. 725/123 |
| 2008/0229025 A1* | 9/2008 | Plamondon ................... 711/126 |
| 2009/0222563 A1* | 9/2009 | Di Giglio et al. ............ 709/227 |
| 2010/0153547 A1* | 6/2010 | Kidachi et al. ................ 709/224 |

FOREIGN PATENT DOCUMENTS

| JP | 2005-293065 | 10/2005 |
| JP | 2006-191594 | 7/2006 |
| JP | 2007-068119 | 3/2007 |

OTHER PUBLICATIONS

International Preliminary Report on Patentability and Written Opinion of the International Searching Authority dated Apr. 15, 2010, from the corresponding International Application.
International Search Report dated Jan. 15, 2008 from corresponding International Application No. PCT/JP2007/068062.

* cited by examiner

*Primary Examiner* — Le H Luu
(74) *Attorney, Agent, or Firm* — Katten Muchin Rosenman LLP

(57) ABSTRACT

A first server detects a condition that requires a service to be invoked, and the detection of this condition triggers it to establish a connection with a second server. The first server relays data relevant to a first communication between first and second terminals and the second server over the established connection. The first server also relays data relevant to a second communication between the first and second terminals and the second server, or between third and fourth terminals and the second server. Alternatively, the second server both receives and returns the data relevant to the first communication from/to the first server over the established connection.

15 Claims, 13 Drawing Sheets

FIG.6

| SERVICE S1 | |
|---|---|
| USER | TERMINAL |
| U1 | 1A |
| U2 | 2A |
| : | : |
| SERVICE S2 | |
| USER | TERMINAL |
| U1 | 1B |
| U2 | 2B |
| : | : |

FIG. 7

| USER IDENTIFYING INFORMATION | IDENTIFYING INFORMATION OF TERMINAL USED IN VOICE SESSION | AS SERVICE SUBSCRIBED-OR-UNSUBSCRIBED STATUS, SUBSCRIBED, UNSUBSCRIBED |
|---|---|---|
| USER U1 | 1A | SUBSCRIBED |
| USER U2 | 2A | SUBSCRIBED |
| USER U3 | 3A | UNSUBSCRIBED |
| : | : | : |

FIG.10

| OUTGOING SIDE TERMINAL | INCOMING SIDE TERMINAL | DOWNLINK BYPASS ROUTE | UPLINK BYPASS ROUTE |
|---|---|---|---|
| MOBILE TERMINAL 1A | MOBILE TERMINAL 2A | SESSION #N1 | SESSION #M1 |
| IMAGE TERMINAL 1B | IMAGE TERMINAL 2B | SESSION #N1 | SESSION #M1 |
| TERMINAL TA | TERMINAL 2TA | SESSION #NT | SESSION #MT |
| .. | .. | .. | .. |

SYSTEM AND METHOD FOR HANDLING SESSION MANAGEMENT IN A COMMUNICATION SYSTEM

CROSS-REFERENCE TO RELATED APPLICATION

This is a continuation of Application PCT/JP2007/068062, filed on Sep. 18, 2007, now pending, the contents of which are herein wholly incorporated by reference.

FIELD

The present invention relates generally to a technology of managing a session status in a communication network.

BACKGROUND

A technology of a server managing a session status in a communication between terminals links up with another server providing a service concerning the communication between these terminals or between terminals related to these former terminals is usable now. For example, in a communication network defined by IMS (IP Multimedia Subsystem), the session is initiated based on a protocol called SIP (Session Initiation Protocol), SDP (Session Description Protocol)-based session information is exchanged, and an RTP (Real Time Transport Protocol) packet is transmitted in a P2P (Peer To Peer) architecture. A progress of transition to NGN (Next Generation network) enables multifarious types of terminals to perform a plurality of communications in a SIP-based session. In this case, the communication network is equipped with a server called an AS (Application Server) which provides services on a variety of media.

In the communication network defined by the IMS, normally the SIP server called a CSCF (Call Session Control Function) manages the session status. In the communication network defined by the IMS in the present situation, however, there is not any specific proposal about a method of how the AS gets involved in the management of the session status.

To be specific, important factors for realizing a service involving a session operation in an extension of an existing voice service (e.g., VoIP (Voice over Internet Protocol)) are a "disclosure of existing session information" and a "session control authority transfer (session transfer)". Hereafter a voice communication service including a meaning of transferring of sound may be called simply as voice service. The voice service provides a kind of telephone function. In the present situation, the AS has no method of knowing the information on the existing session established by the CSCF. It is therefore difficult to provide the service involving the session operation in the extension of the existing voice service (see FIG. 1, FIG. 2).

In FIG. 1, a user U1 of a mobile terminal 1A telephones a user U2 of a mobile terminal 2A via the CSCF. At this time, a voice session (parent session) is established between the mobile terminals 1A and 2A via the CSCF. In this case, there has hitherto been no function of newly providing a multimedia service related to the voice session.

For example, the session for transmitting and receiving an image through an intermediary of the AS could not be established by way of an extension of the parent session between the user U1 and the user U2. Moreover, new image terminals 1B, 2B could not be added by way of an extension of the voice session between the user U1 and the user U2. Namely, the communication using the image terminals 1B and 2B in which the AS intervenes could not be established by way of the extension of the parent session. The reason why so is that there is no method by which the AS gets involved in the existing session managed by the CSCF. Thus, it was not feasible to add the new service involving the session operation via the AS with respect to the existing voice session.

Herein, the parent session connotes a session established via the CSCF between the user U1 and the user U2. Further, a second session, in which the AS intervenes, configured in relation to the parent session is referred to as a child session (of which a status is termed child presence).

[Patent document 1] Japanese Patent Laid-Open Publication No. 2006-191594

SUMMARY

It is an aspect of the embodiment to enable management of a communication between terminals to be transferred from a first server to another server, such as a linkage between the first server managing a session status in the communication between the terminals and another server providing a service related to the communication between these terminals or between terminals associated with these former terminals.

One mode of the embodiment is illustrated by a communication technology in a system including: a first server managing a first communication between a first terminal and a second terminal: and a second server providing a service about a second communication associated with the first communication between the first terminal and the second terminal or between a third terminal related to the first terminal and a fourth terminal related to the second terminal.

In this technology, the first server detects a condition under which the service related to the second communication associated with the first communication may be started up, and establishes a connection with the second server as triggered by detecting the condition. Then, the first server relays data about the first communication to between the first and second terminals and the second server through the established connection.

On the other hand, the second server receives the data about the first communication from the first server through the established connection and sends the data back to the first server. Then, the second server starts the service based on the second communication.

With this configuration, the system enables the second server to get involved in the first communication. Moreover, the second server can provide the service based on the second communication as well as getting involved in the first communication.

Still further, according to another mode, the second server may detect a condition under which the service related to the second communication associated with the first communication may be started up and may transmit to the first terminal via the first server, upon detecting the condition, a transfer request for transferring management of the first communication to the second server from the first server. Then, the second server may receive, after the transfer request, a request for a connection of the first communication via the first server from the first terminal and may make a response to the request for the connection of the first communication from the first terminal without specifying a connection responder. Through this operation, the second server may establish a temporary connection based on the first communication with the first terminal when finishing the response to the connection request given from the first terminal.

Moreover, the second server may transmit to the second terminal via the first server, upon detecting the condition, a transfer request for transferring the management of the first communication to the second server from the first server.

Then, the second server may receive, after the transfer request, the request for the connection of the first communication via the first server from the second terminal and may make a response to the request for the connection of the first communication from the second terminal without specifying a connection responder. Further, the second server may establish a temporary connection based on the first communication with the second terminal upon finishing the response to the connection request given from the second terminal.

Yet further, the second server may transmitting a first connection request to the first terminal via the first server without specifying a connection requester and may receive a response to the first connection request from the first terminal via the first server.

Then, the second server may acquire information of a connecting destination of the first terminal from the received response and may transmit a second connection request with the first terminal specified as a connection requester to the second terminal by use of the information of the connecting destination of the first terminal.

Thus, the second server may start the management of the first communication after receiving the response to the second connection request. Moreover, the second server may release the temporary connection based on the first communication between the first terminal and the second server and the temporary connection based on the first communication between the second terminal and the second server.

Moreover, according to still another mode, the second server, may execute the management of the first communication based on the transfer request without establishing the temporary connection with the second terminal. In this case, the second server may transmit the transfer request to the second terminal after establishing the temporary connection based on the first communication with the first terminal. Then, the second server may make the response to the connection request of the first communication from the second terminal in a way with the first terminal specified as the connection responder by use of the information of the connecting destination of the first terminal in the temporary connection.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 3 is a sequence diagram illustrating a method by which the CSCF manages the session and relays a call from a user who subscribes an AS-based service to the AS.

FIG. 6 is a diagram illustrating an example of a structure of a service subscription information table.

FIG. 7 is a diagram illustrating an example of a structure of an AS service subscribed-or-unsubscribed status determining table.

FIG. 8 is a sequence diagram illustrating a method by which the communication of the CSCF is bypassed to the AS.

FIG. 10 is a diagram illustrating a structure of a bypass route table for defining a bypass route.

DESCRIPTION OF EMBODIMENT(S)

A communication system according to an embodiment will hereinafter be described with reference to the drawings.

An aspect of a communication method according to the embodiment will be discussed. The aspect of the communication system lies in providing an effective linkup method between a CSCF (Call Session Control Function) and an AS (Application Server). The following are descriptions of outlines of a method by which the CSCF manages the session and notifies the AS of the session, a method by which the CSCF and the AS separately manage the session, a method by which a communication of the CSCF is bypassed to the AS and a method of reestablishing of a via-AS session based on a transfer (REFER).

(1) Method by which CSCF Manages Session and Notifies AS of Session

Figure 1:
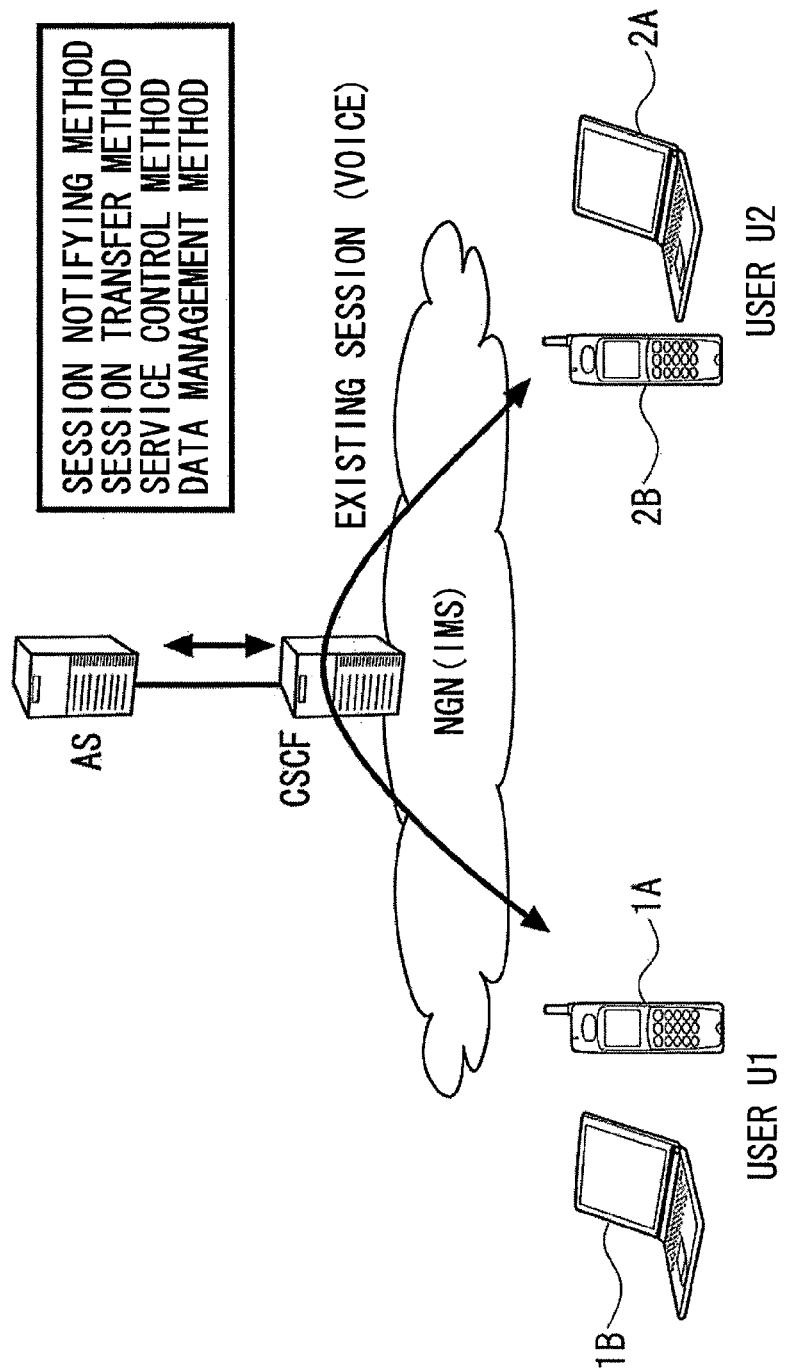
FIG. 1 is a diagram illustrating a relationship between a CSCF-based voice session and an AS-based image session.
Figure 2:
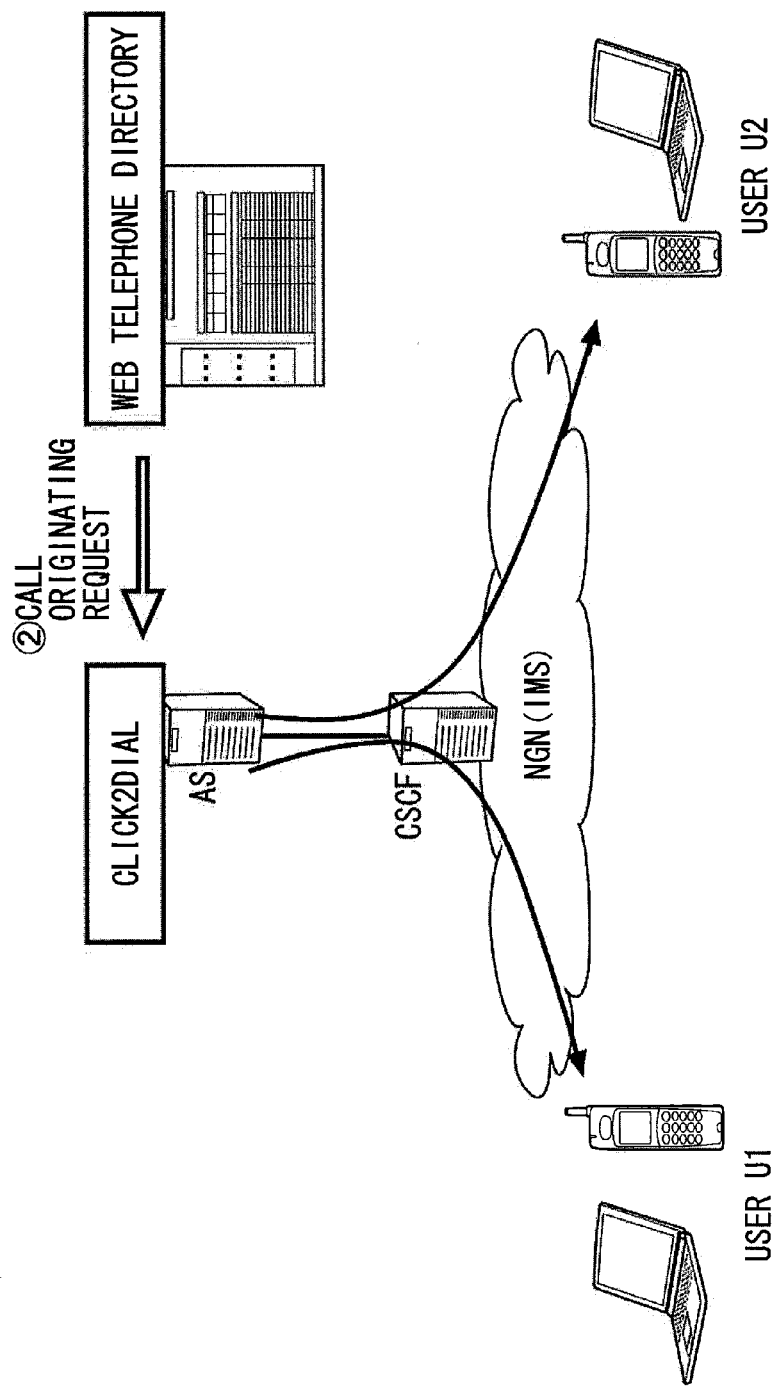
FIG. 2 is a diagram illustrating a general method of providing session information to the AS in a CSCF-based control method.
Figure 3:
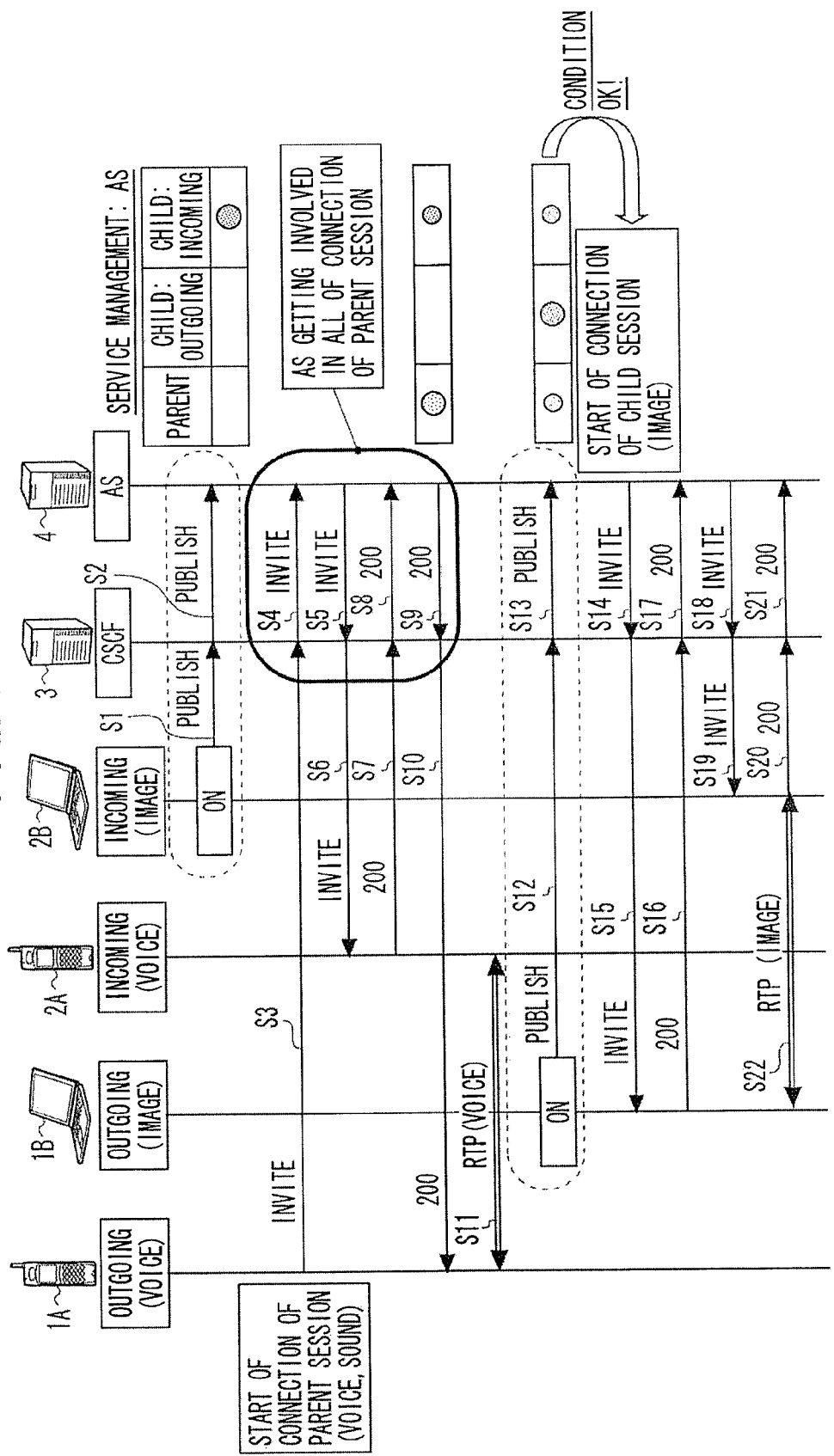

FIG. 3 illustrates an example of the method by which a CSCF 3 manages the session and relays a call (which will hereinafter be referred to as an AS service subscription call) from a user who subscribes an AS-based service.

The communication system includes mobile terminals 1A (corresponding to a first terminal) and 2A (corresponding to a second terminal) which transmit and receive sounds (voices) to and from each other, image terminals 1B (corresponding to a third terminal) and 2B (corresponding to a fourth terminal) which transmit and receive images to and from each other, a CSCF 3 (corresponding to a first server) which manages a start and an end of the voice communications between the mobile terminals 1A, 2A, and an AS 4 (corresponding to a second server) which provides the communication service containing the image between the image terminals 1B, 2B.

Herein, the mobile terminals 1A, 2A access the Internet via, e.g., a mobile telephone network, a wireless LAN (Local Area Network), etc and perform the communications with a variety of servers, e.g., the CSCF 3 on the Internet. Each of the mobile terminals 1A, 2A includes a CPU (Central Processing Unit), a voice input device (a microphone), a voice output device (a speaker), a memory, a display unit (a liquid crystal display, an electroluminescence panel, etc), an operation unit (keys, a pointing device, etc), a wireless communication interface, a wired communication interface, and so on. Each of these mobile terminals 1A, 2A is exemplified by a mobile phone, a PDA (Personal Digital Assistant or Personal Data Assistance), a PHS (Personal Handyphone System), etc, and a description thereof is omitted because of its configuration being well known. Note that the voice input device, the voice output device and a normal type of personal computer having a function of accessing the Internet may be used as substitutes for the mobile terminals 1A, 2A. Namely, the mobile terminals 1A, 2A are not necessarily indispensable for an architecture of the communication system.

Each of the image terminals 1B, 2B includes the CPU, the memory, the display unit (the liquid crystal display, the electroluminescence panel, etc), the operation unit (the keys, the pointing device, etc), the wireless communication interface, the wired communication interface, and so forth. Each of the image terminals 1B, 2B is exemplified by the personal computer.

The CSCF 3 is a server which is connected to the Internet and thus provides a SIP (Session Initiation Protocol) service. The CSCF 3 includes, e.g., the CPU, the memory, the display unit (the liquid crystal display, the electroluminescence panel, etc), the operation unit (the keys, the pointing device, etc), the wireless communication interface, the wired communication interface, etc.

In the architecture in FIG. 3, the CSCF 3 functions as the relay device to the AS 4 in place of providing the function of the original SIP server. To be specific, the CSCF 3 relays, to the AS 4, a request (also termed a method) or a response (also termed a response code) given from the mobile terminals 1A, 2A, etc. Further, the CSCF 3 relays the request or the response from the AS 4 to the mobile terminals 1A, 2A.

The AS 4 is a server connected to the Internet and providing an IMS-based application service. The AS 4 includes, e.g., the CPU, the memory, the display unit (the liquid crystal display, the electroluminescence panel, etc), the operation unit (the keys, the pointing device, etc), the wireless communication interface, the wired communication interface, etc.

In the embodiment, the AS 4 functions as the SIP server in place of the CSCF 3. Accordingly, the AS 4 receives the requests and responses from the mobile terminals 1A, 2A via the CSCF 3, and executes a process corresponding to each of the received requests and responses. For instance, the AS 4, in response to a session establishing request (INVITE), transfers the request to a called party and sends the response therefrom to a requester. Further, the AS 4, upon receiving a request for status notification, manages the status of each terminal, corresponding to the notification.

Figure 5:
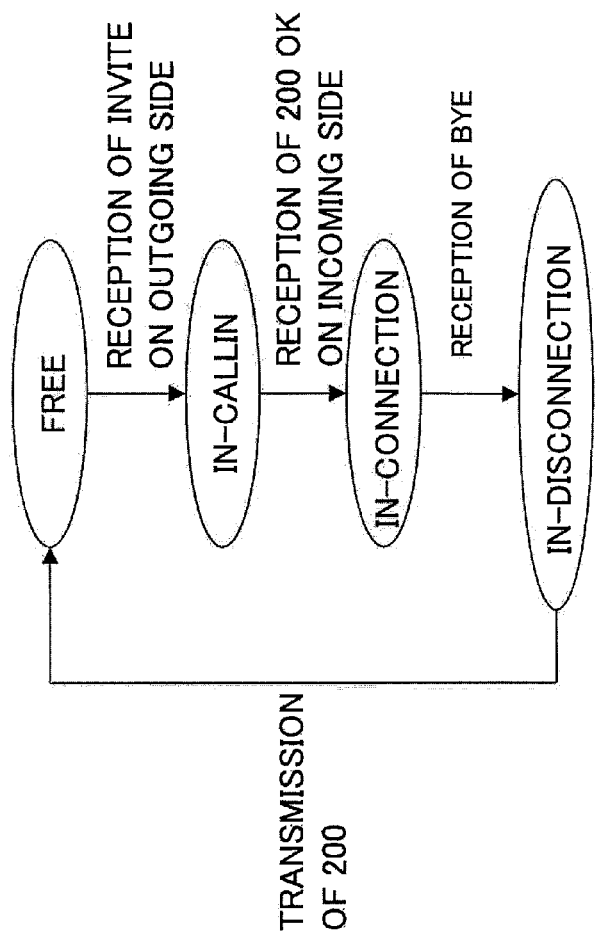
FIG. 5 is a diagram illustrating one example of a relationship between a request and a response received from terminals such as mobile terminals 1A and 2A and a status of the session to which the terminal is related.

FIG. 5 illustrates one example of a relationship between the requests/responses received from the terminals such as the mobile terminals 1A, 2A and the session statuses to which the terminals are related. In FIG. 5, when receiving INVITE from the terminal on the outgoing side, it is understood that a status between the outgoing side and the incoming side becomes an in-calling status. Further, when the SIP server receives a 200 (200 OK) response from the terminal on the incoming side, a status between the outgoing side and the incoming side becomes an in-connecting status, and it is recognized that the session is established. Moreover, when the SIP server receives a BYE request from any one of the terminals on the outgoing side or the incoming side, the session status gets into an in-disconnecting status. Then, when receiving the 200 OK response from the BYE sender terminal, each terminal becomes a free status.

In the architecture in FIG. 3, the AS 4 functions as the SIP server and manages the statuses in FIG. 5 for the respective terminals (the mobile terminals 1A, 2A, etc).

If the users of the mobile terminals 1A, 2A has the subscriptions to receive the AS-based service, the mobile terminals 1A, 2A initiate the session for a voice conversation via the CSCF 3 functioning as the relay device and the AS 4 functioning as the SIP server, thus providing a voice conversation function. It is noted that if the users of the mobile terminals 1A, 2A have not the subscriptions to receive the AS-based service, in the same way as by the prior art, the CSCF 3 may provide the function of the SIP server to the mobile terminals 1A, 2A.

Thus, in the procedures in FIG. 3, during the continuation of the session for the voice conversation between the mobile terminals 1A, 2A, it follows that the CSCF 3 provides the session information to the AS 4. Moreover, the image terminals 1B, 2B, when reaching a status capable of transmitting and receiving the image information, notify via the CSCF 3 the AS 4 of having reached this status.

The AS 4 recognizes from the subscription information that the mobile terminal 1A and the image terminal 1B are the terminals employed in the service for a specified user U1. Further, the AS 4 recognizes from the subscription information that the mobile terminal 2A and the image terminal 1B are the terminals used in the service for a specified user U2. Then, the AS 4, when the voice session is initiated between the mobile terminals 1A and 2A and when recognizing that both of the image terminals 1B, 2B reach the status capable of transmitting and receiving the image information, initiates a image session between the image terminals 1B and 2B as the session related to the voice session between the mobile terminals 1A and 2A.

As a result, the image is transmitted and received between the image terminals 1B and 2B. For example, if the user U1 utilizing the mobile terminal 1A is in the middle of telephoning the user U2 using the mobile terminal 2A, the initiation of the session of the telephone is a trigger which enables the image information to be transmitted and received between the image terminal 1B held by the user U1 and the image terminal 2B held by the user U2. Namely, the user U1 and the user U2 initiate the voice session by operating the mobile terminals 1A, 2A, which is accompanied by the connection of the image session, and the service is thereby started.

In this case, the voice session initiated at first by the operations of the users U1, U2 is defined as a parent session. Further, a child session is a session between the image terminals 1B and 2B, of which the initiation is triggered by the initiation of the parent session under a condition that the session between the image terminals 1B and 2B comes to the ready for its initiation.

FIG. 6 illustrates an example of a structure of a service subscription information table. The service subscription information table is stored in a memory of at least one the CSCF 3 and the AS 4. The service subscription information table has a definition of information for identifying the user who has the subscription to receive the service provided by the communication system and a definition of information for identifying the terminal used when the user receives the service.

In this example, it is recorded in a service S1 (e.g., a voice communication service) that the user U1 uses the mobile terminal 1A, while the user U2 employs the mobile terminal 2A. Herein, the "user U1, the user U2, etc" are pieces of identifying information for identifying the users in the communication system. Further, the "mobile terminals 1A, 2A, etc" are specified by SIP URIs (Uniform Resource Identifiers).

FIG. 7 illustrates an example of a structure of an AS service subscribed-or-unsubscribed status determining table. The AS service subscribed-or-unsubscribed status determining table is stored in the memory of the CSCF 3. The AS service subscribed-or-unsubscribed status determining table is a table to which the CSCF 3 refers when receiving the request in the voice session that should become the parent session and when determining whether this request is the AS service subscription call or not.

As in FIG. 7, each row in the AS service subscribed-or-unsubscribed status determining table contains fields such as "user's identifying information", "identifying information of terminal used in voice session" and "AS service subscribed-or-unsubscribed status".

The "user's identifying information" is the identifying information of the user who has subscribed the voice session and is, e.g., a subscriber number of the voice conversation service (VoIP). The "identifying information of terminal used in voice session" is, e.g., a SIP-URI of the terminal concerned. The CSCF 3, when storing the service subscription information in the service subscription information table in FIG. 6, checks the AS service subscribed-or-unsubscribed status determining table. Then, if "unsubscribed" is registered in the AS service subscription status with respect to the SIP-URI of the terminal set in the service subscription information table, the CSCF 3 changes the AS service subscription status to "subscribed". Thus, it follows that "subscribed" is set in the AS service subscription status in the AS service subscribed-or-unsubscribed status determining table with respect to the terminal with one or more AS service subscriptions being settled. The AS service subscribed-or-unsubscribed status determining table and the service subscription information table correspond to a terminal associated information storage unit stored with the identifying information of each of a plurality of first terminals and identifying information of each of second terminals in the way of being associated with each other.

The CSCF 3 determines by referring to the AS service subscribed-or-unsubscribed status determining table whether the sender of the request in the voice session is the AS service subscriber or not, thus identifying the AS service subscription call. It is noted, the determination as to whether or not the message is the AS service subscription call does not necessarily entail the identifying information of the user. Namely, if the AS service subscribed-or-unsubscribed status determining table contains the identifying information (SIP-URI) of the terminal, it may be determined based on the SIP-URI on the outgoing side of the received request whether the message is the AS service subscription call or not. In the embodiment, the AS service subscribed-or-unsubscribed status determining table may be stored in the memory of the CSCF 3.

A processing procedure of the communication system will hereinafter be described with reference to FIG. 3. At the first onset, an assumption herein is that in any one of the image terminals 1B, 2B, which is herein the image terminal 2B, a function utilized for the image communication service is switched ON. Herein, the function utilized for the image communication service being switched on is illustrated by a startup etc of a image display program. Then, a communication program of the image terminal 2B notifies the CSCF 3 that the function utilized for the image communication service is switched ON (an arrowhead S1). This notification is conducted by use of, e.g., the SIP-based request "PUBLISH". The PUBLISH is used for notifying of the statuses of the mobile terminals 1A, 2A and the image terminals 1B, 2B, which perform the SIP-based communications. The PUBLISH contains notification saying that the function is switched ON and the SIP-URI of the image terminal 2B with its function being switched ON. The CSCF 3 receiving this notification corresponds to a second terminal status receiving unit. The CSCF 3 functions as the relay device and further notifies the AS of the received notification (an arrowhead S2).

The CSCF 3 executing this notification corresponds to a second terminal status notifying unit.

As a result, the AS 4 recognizes that the function used for the image communication service is switched ON in the image terminal 2B, and records the "function-ON" together with the SIP-URI of the image terminal 2B in a service management table. An example in FIG. 3 is that "receivable in one terminal related to the child session" is recorded.

Next, for example, the mobile terminal 1A detects an operation of the user U1 and requests the CSCF to initiate a voice(sound)-based parent session connected to the mobile terminal 2A (an arrowhead S3). At this time, the mobile terminal 1A transmits a SIP-based request "INVITE" to the CSCF 3. Hereat, the mobile terminal 2A is designated as a called party of the voice session.

As described above, in the embodiment, the CSCF 3 functions as the relay device, and, with respect to the voice session, the AS 4 intervenes in the session maintained by the connection between the mobile terminals 1A, 2A of the users who have the subscription to receive the AS service. For example, the CSCF 3 determines, when receiving the request "INVITE", whether the outgoing side has made the subscription to receive the AS service and, if the AS service has been subscribed, transfers the INVITE temporarily to the AS 4 (an arrowhead S4). Then, the AS 4 transmits the request "INVITE" to the mobile terminal 2A on the incoming side via the CSCF 3 (arrowheads S5, S6).

The mobile terminal 2A sends a response (200, which is also termed OK) purporting a session initiation acknowledgement back to the CSCF 3 (an arrowhead S7). As for the response, the CSCF 3 similarly determines whether the sender of this response has made the subscription to receive the AS service or not, and, if the subscription of the AS service has been made, the CSCF 3 transfers the response temporarily to the AS 4 (an arrowhead S8). This response code 200 is transmitted from the AS 4 via the CSCF 3 to the mobile terminal 1A on the outgoing side which has initiated the voice session (arrowheads S9, S10). This triggers the initiation of voice session between the mobile terminals 1A and 2A (an arrowhead S11).

At this time, the AS 4 records an event that the voice session defined as the parent session is initiated between the mobile terminals 1A and 2A, in the service management table.

Herein, it is further assumed that a function utilized for the image communication service is switched ON in the image terminal 1B. Then, the communication program of the image terminal 1B notifies the CSCF 3 that the function utilized for the image communication service is switched ON (an arrowhead S12). This notification is carried out by use of, e.g., the SIP-based request "PUBLISH". The CSCF 3 further notifies the AS 4 of the received notification (an arrowhead S13).

Then, the AS 4 recognizes that the function utilized for the image communication service is switched ON in the image terminal 1B and records, in the service management table, this purport with respect to the SIP-URI reaching the function-ON status. As a result, the AS recognizes that the function utilized for the image communication service is switched ON in both of the image terminals 1B, 2B which intervene in the child session, and further recognizes that the parent session is initiated.

As a result, the AS 4 starts connecting the image session defined as the child session associated with the parent session. To be specific, the AS 4 transmits the INVITE to the image terminal 1B via the CSCF 3 (arrowheads S14, S15). At this time, SDP information (SIP-URI) of the image terminal 2B is stored in the service management table, and hence the INVITE contains designation of the SIP-URI of the image terminal 2B as the SDP information on the outgoing side. In response to this, a message "200 OK" purporting the acknowledgement is sent back from the image terminal 1B (arrowheads S16, S17).

Further, the INVITE is transmitted via the CSCF 3 to the image terminal 2B (arrowheads S18, S19). At this time, the SDP information (SIP-URI) of the image terminal 1B is stored in the service management table, and hence the INVITE contains the designation of the SIP-URI of the image terminal 1B as the SDP information on the outgoing side in the image session (child session). In response to this, the message "200 OK" purporting the acknowledgement is sent back from the image terminal 2B (arrowheads S20, S21). The RTP session based on the image is initiated between the image terminals 1B and 2B (an arrowhead S22).

Thus, according to the procedures illustrated in FIG. 3, the CSCF 3 functions as the relay device, all of the AS service subscription calls are transferred to the AS 4, and the AS 4 is made to function as the SIP server, thereby enabling the AS 4 to get involved in the parent session.

(2) Method by which CSCF and the as Separately Manage Session

Figure 4:
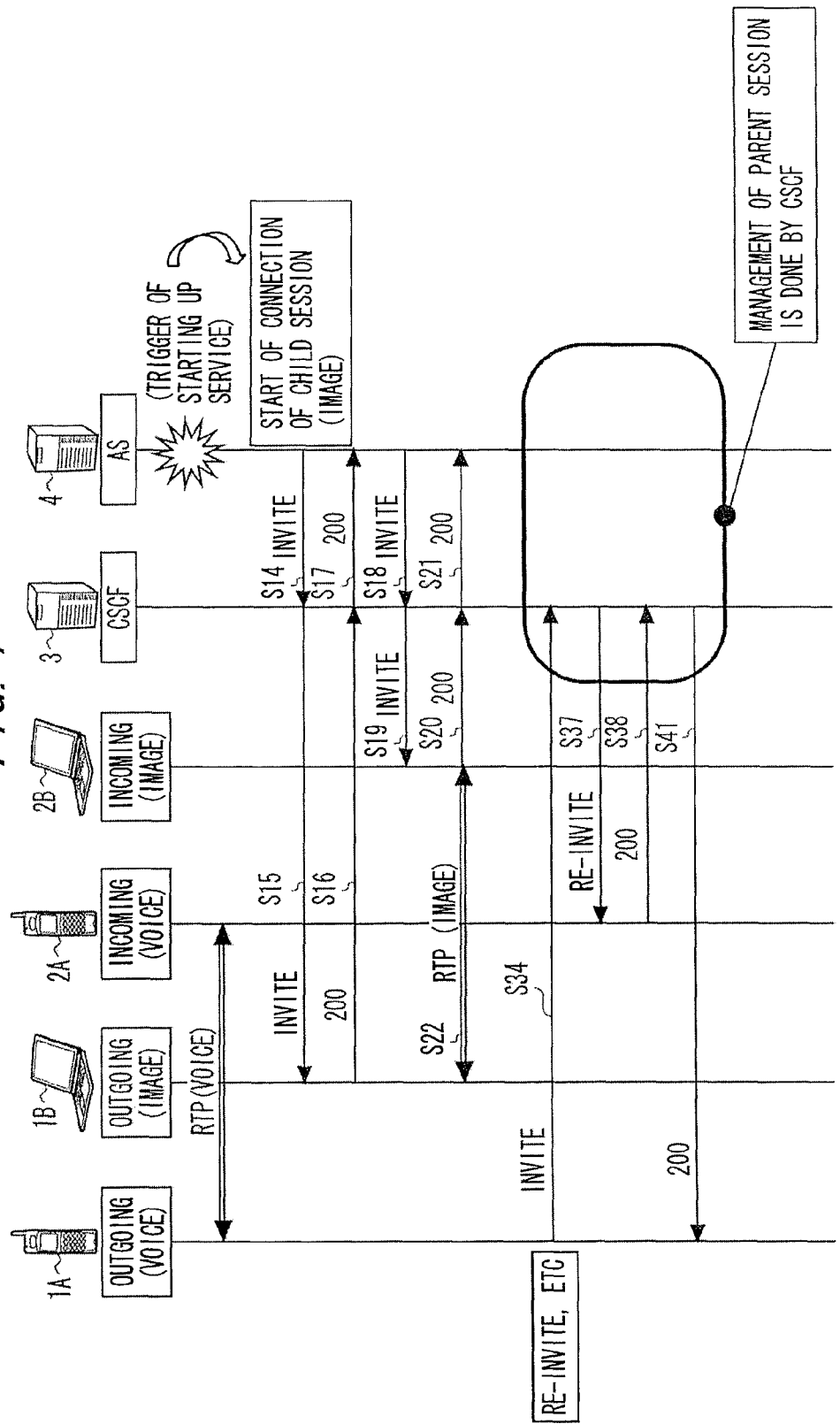
FIG. 4 is a sequence diagram of a system in which the CSCF 3 manages the voice session (parent session), and the AS manages the image session (child session) associated with the voice session independently of the CSCF.

FIG. 4 illustrates a sequence diagram of a system in which the CSCF 3 manages the voice session (the parent session), while the AS 4 manages, independently of the CSCF 3, the image session (the child session) related to the voice session.

Note that the procedures of establishing the session in which AS 4 provides the service are herein omitted. For example, however, similarly to FIG. 3, an available scheme is that the AS 4 detects that the service providing condition is satisfied and establishes the session for the image terminals 1B and 2B. Further, for instance, another available scheme is that the AS 4 receives, from the CSCF 3, a piece of notification saying that the image terminals 1B, 2B complete the preparation for receiving the session and that there is established the voice session between the mobile terminals 1A, 2A, which is associated with the session between the image terminals 1B, 2B. Then, the AS 4, when the conditions described above are fulfilled, may establish the child session between the image terminals 1B, 2B in the same procedures as S14-S22 in FIG. 3. Herein, the parent session and the child session are managed by the CSCF 3 or the AS 4 according to the information which associates the service with the terminal as in FIG. 6 or 7.

Moreover, the session may also be established by accessing the AS 4 from the image terminals 1B, 2B through a manual operation of the user.

In the method in FIG. 4, also in the case of the child session being established, the CSCF 3 manages the parent session, while the AS 4 manages the child session. Accordingly, the mobile terminals 1A, 2A periodically check the connection, and the CSCF 3 manages a request Re-INVITE also in the case of transmitting and receiving the request Re-INVITE for refreshing the session. Namely, the CSCF 3 receives the request Re-INVITE from the mobile terminal 1A on the outgoing side (an arrowhead S34) and forwards the Re-INVITE to the mobile terminal 2A on the incoming side (an arrowhead S37). Further, the CSCF 3 receives the response "200 OK" from the mobile terminal 2A on the incoming side (an arrowhead S38) and forwards the 200 OK to the mobile terminal 1a on the outgoing side (an arrowhead S41). During this process, the AS 4 does not intervene in the voice session between the mobile terminals 1A, 2A.

(3) Method by which Communication of CSCF is Bypassed to AS

Figure 8:
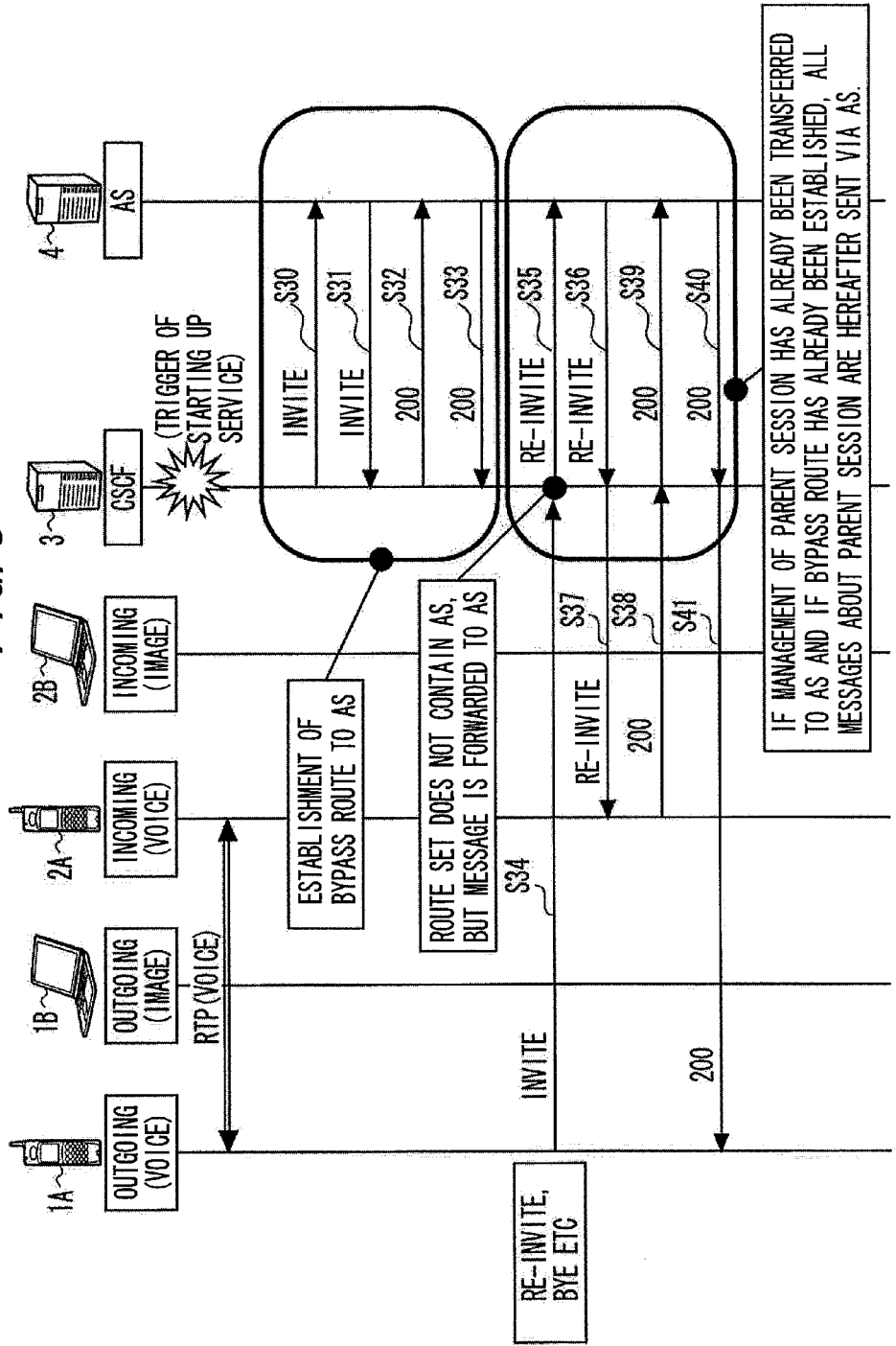

This method involves, in the case of determining that the AS providing service is started, ensuring a bypass route between the CSCF and the AS (see FIG. 8). Hereafter, the CSCF performs the control so that this call is bypassed to the AS (see FIGS. 8 and 9). It appears to the AS that a bypass signal is a newly-originated normal call, and therefore any special function is not required. For example, in FIG. 8, the INVITE (the arrowhead S30) for establishing the bypass route may be, when viewed from the AS 4, processed in the same way as the normal INVITE transmitted from the CSCF 3 is processed.

The CSCF, when the AS providing service reaches the startup condition, ensures the bypass route between the CSCF and the AS so that the subsequent parent session is bypassed to the AS. Hereafter, in the case of receiving the requests (the refresh Re-INVITE and the BYE) of the parent session from the outgoing/incoming terminals, the CSCF conducts the control so that the requests are bypassed to the AS, though the AS is not contained in an original route-set. Herein, the "original route-set" represents a connection route formed based on the INVITE when the RTP session is initiated for the first time. It is noted, an in-depth description of this method will be made in <<First Embodiment>>.

(4) Method of Re-establishment to Via-AS Session Based on Transfer (REFER)

Figure 11:
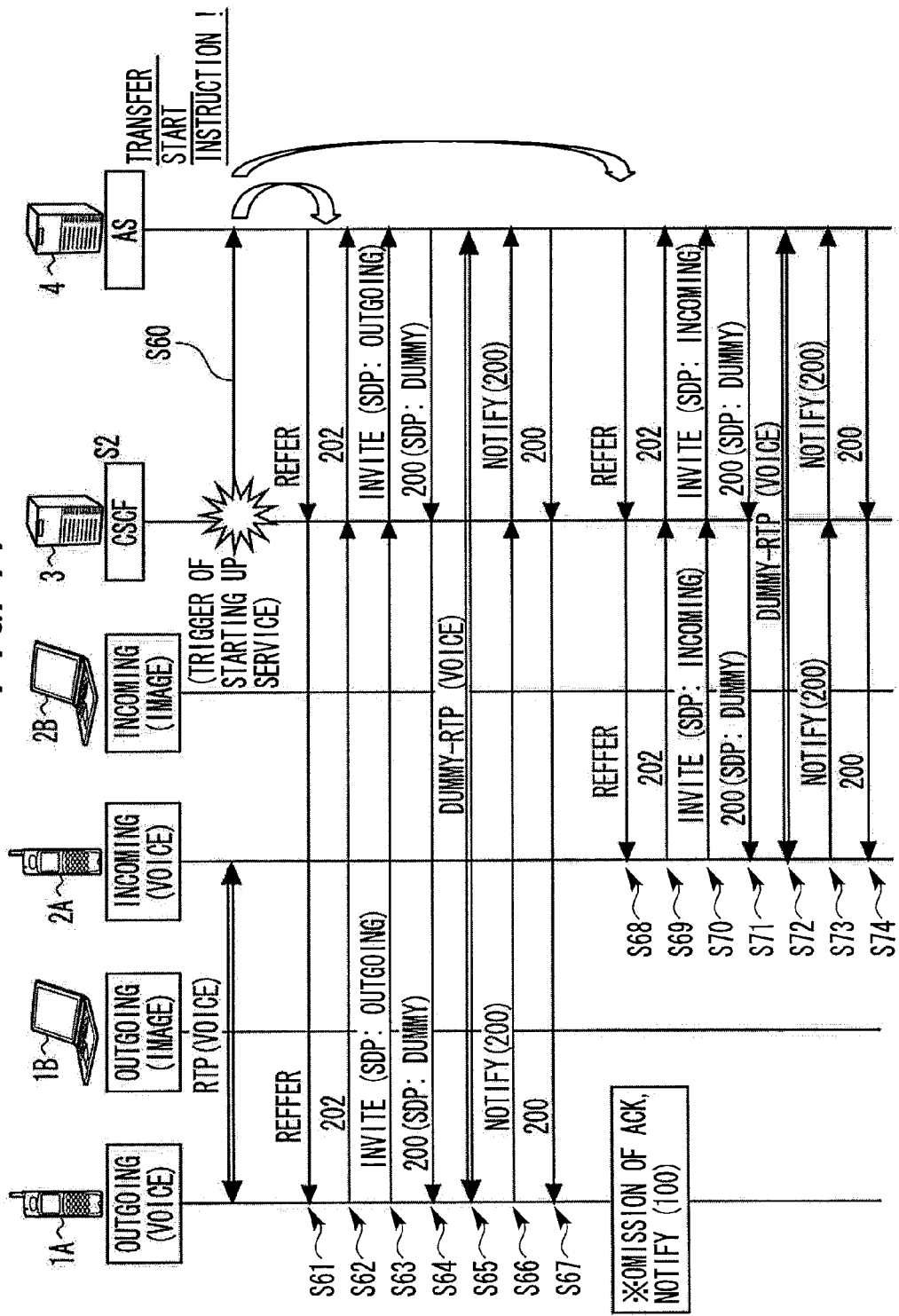
FIG. 11 is a sequence diagram (part 1) of a procedure of transferring management of the parent session to the AS from the CSCF.
Figure 12:
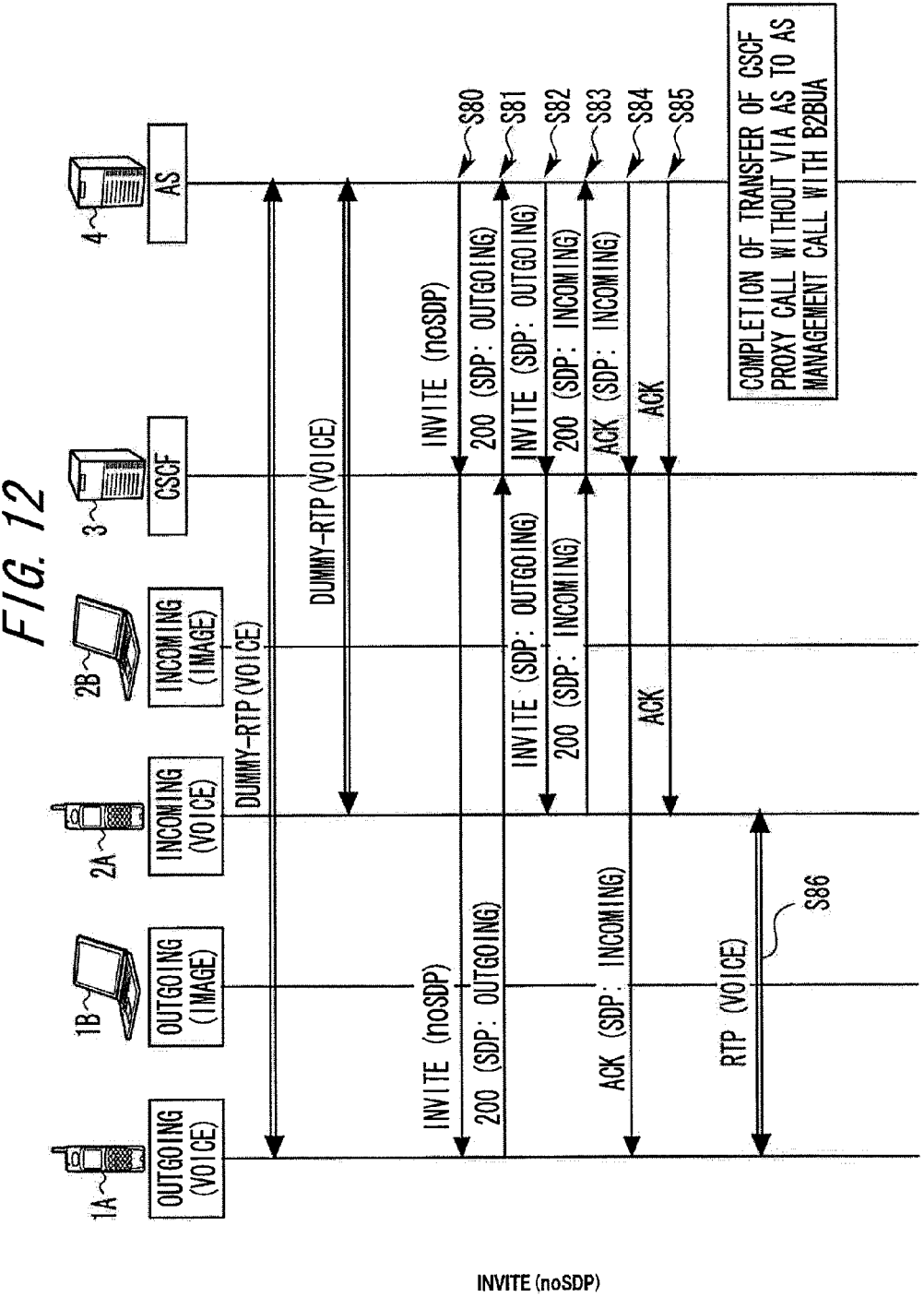
FIG. 12 is a sequence diagram (part 2) of the procedure of transferring the management of the parent session to the AS from the CSCF.

In this method, a transfer instruction (REFER) is given to the terminal on the outgoing side and the terminal on the incoming side, and re-establishment of the session to a session via the AS is carried out without any disconnection (see FIGS. 11 and 12). Herein, the "re-establishment of the session" connotes a transition to a new session without interrupting the communications between the users in the already-established session.

The AS issues, when detecting the startup of the service, the transfer instruction (REFER etc) addressed to the AS to the outgoing terminal and the incoming terminal, and establishes a session between the outgoing terminal and the AS and a session between the AS and the incoming terminal, thus establishing outgoing/incoming RTP under B2BUA (Back to Back User Agent) control. Herein, the B2BUA control connotes control for establishing, so to speak, a back-to-back linkage between a couple of devices unable to recognize mutual existences as between the outgoing terminal and the AS and between the AS and the incoming terminal by use of a management device such as the CSCF. This scheme enables the session management to transition to the AS.

This CSCF may simply operate as a proxy server (relay device). In this case, the terminal needs to support the transfer instruction (REFER etc). It is desirable for making an SDP re-negotiation when re-establishing the session to support a request of noSDP and a response thereof to the greatest possible degree. The "noSDP request" connotes the request such as the INVITE with the SDP information being unspecified and the response such as 200 OK with the SDP information being unspecified. Note that an in-depth description of the present method will be made in <<Second Embodiment>>.

<<First Embodiment>>

Figure 9:
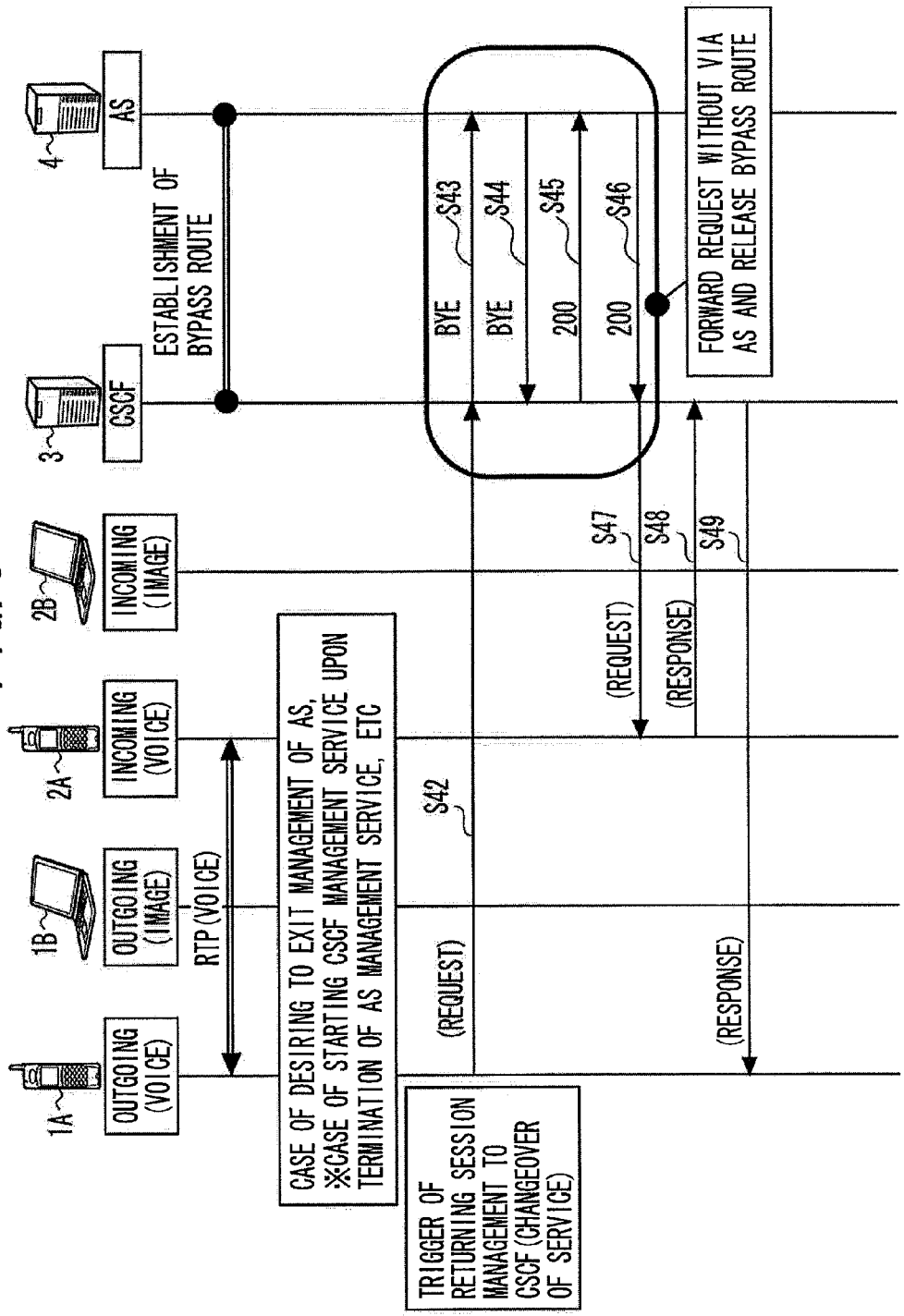
FIG. 9 is a sequence diagram illustrating a bypass route releasing process.

FIGS. 8 and 9 illustrate sequence diagrams of the communication system according to a first embodiment. In the first embodiment, the session is managed by a method, in which the communication of the CSCF is bypassed to the AS. The components of the terminals and the servers included in the present communication system are the same as those in the case of FIGS. 3 and 4. Such being the case, the same components as those in FIGS. 3 and 4 are marked with the same numerals and symbols, and their descriptions are omitted.

FIG. 8 depicts a sequence of a bypass route configuring process. This process can be realized by a computer program executed by the CSCF 3 and the AS 4, respectively. Herein, the SIP-based parent session has already been established between the mobile terminals 1A, 2A. In FIG. 8, the parent session is managed by the CSCF 3. In this status, with a trigger of the startup of a specified service, the CSCF 3 executes the bypass route configuring process in which the management information of the parent session is bypassed to the AS 4. The trigger of the startup of the specified service connotes a trigger including, e.g., a case in which the specified status is established between the image terminals 1B, 2B, a case in which the child session is established between the image terminals 1B, 2B with respect to the parent session, a case in which an establishment-enabled condition is fulfilled, a case in which the service request is given from the image terminal 1B or 2B, and so on. The CSCF 3 detecting this trigger corresponds to a detecting unit. This type of detecting unit can be realized as the computer program executed on the CPU included in the CSCF 3.

In the bypass route configuring process, the CSCF 3 (corresponding to a first server and a management device) at first transmits the request "INVITE" to the AS (corresponding to a second server, a server and a computer) (an arrowhead S30). In this case, the request "INVITE" is a session establishing request on an uplink route extending toward the AS 4 from the CSCF 3.

As for this INVITE, the AS 4, to begin with, transmits the request "INVITE" to the CSCF 3 (an arrowhead S31). The request "INVITE" transmitted from the AS 4 is the session establishing request on a downlink route extending from the AS 4 toward the CSCF 3. Then, in response to the downlink session establishing request, the CSCF 3 sends back the response "200 OK" (an arrowhead S32). The session on the downlink route is thereby established.

Then, the AS 4, when receiving the response "200 OK", sends back the response "200 OK" in response to the session establishing request on the uplink route (an arrowhead S33). The session on the uplink route is thereby established. As a result, there are established the session in the uplink direction from the CSCF 3 to the AS 4 and the session in the downlink direction from the AS 4 to the CSCF 3. Through the operations described above, the bypass route configuring process is terminated.

At this time, the CSCF 3 saves a definition of the bypass route generated in a bypass route definition table. Further, the AS 4 saves the definition of the bypass route generated in the bypass route definition table. The CSCF 3 establishing the downlink session and the uplink session corresponds to an establishing unit. This type of establishing unit can be actualized as the computer program executed on the CPU included in the CSCF 3.

Hereafter, the AS service subscription call transmitted from the mobile terminal 1A and the mobile terminal 2A to the CSCF 3 is forwarded to the AS 4 via the uplink bypass route. Then, the AS service subscription call forwarded to the AS 4 from the CSCF 3 is returned to the CSCF 3 via the downlink bypass route.

Similarly, the request, the response, etc between the image terminals 1B, 2B are forwarded to the AS 4 from the CSCF 3 via the uplink bypass route and further returned to the CSCF 3 from the AS 4 via the downlink bypass route. Thus, the CSCF 3, which relays the request and the response to between the mobile terminals 1A, 2A and the AS 4, corresponds to a relay unit. Moreover, the CSCF 3, which relays the request and the response to between the image terminals 1B, 2B and the AS 4, corresponds to the relay unit. This type of relay unit can be realized as the computer program executed on the CPU included in the CSCF 3.

It appears to the AS 4 that the session established based on this INVITE is the general SIP-based session, and hence the session management process via the configured bypass route may be executed in the same way as the normal SIP-based session is managed. An example of FIG. 8 illustrates a case where the mobile terminal 1A transmits and receives the request "Re-INVITE" for refreshing the session to and from the mobile terminal 2A. The CSCF 3, when receiving the request "Re-INVITE" from the mobile terminal 1A on the outgoing side (an arrowhead S34), forwards this request to the AS 4 via the uplink bypass route (an arrowhead S35).

The AS 4, upon receiving the request "Re-INVITE" (the arrowhead S35), loops this request back to the CSCF 3 via the downlink bypass route (an arrowhead S36). The AS 4 executing this loop-back process corresponds to a loop-back unit. The process of the loop-back unit is the same process as in the normal SIP-based service. In this case, it appears to the AS 4 that the CSCF 3 is the terminal on the outgoing side (or the incoming side). The AS 4 can, however, intervene in the voice session on the basis of the information such as the Re-INVITE etc transferred and received for the session management.

The CSCF 3 forwards this request to the mobile terminal 2A on the incoming side (an arrowhead S37). Further, the CSCF 3 receives the response "200 OK" from the mobile terminal 2A on the incoming side (an arrowhead S38) and forwards this response to the AS 4 via the uplink bypass route (an arrowhead S39). The AS 4, when receiving the response "200 OK" (an arrowhead S39), loops the response back to the CSCF 3 via the downlink bypass route (and arrowhead S40).

The CSCF 3 forwards this response to the mobile terminal 1A on the outgoing side (an arrowhead S41). Note that the AS 4 intervenes in the management of the parent session by transmitting and receiving the request and the response via the bypass route such as this. In this case, the session management may be done by the CSCF 3 and may also be done by the AS 4.

The AS 4 makes the session management, in which case the CSCF 3 may stop managing the voice session in the way of this stop being triggered by establishing the bypass route. For example, the CSCF 3 functions simply as the relay device of the Re-INVITE etc and may stop the SIP-based service for the mobile terminals 1A, 2A. The CSCF 3 executing such a stopping process corresponds to a stopping unit. This type of stopping unit can be realized as the computer program executed on the CPU included in the CSCF 3. Further, the AS 4 may start managing the voice session as triggered by establishing the bypass route. Namely, with this trigger, the AS 4 may start up the function of relaying the request "Re-INVITE" etc or the response to the incoming side from the outgoing side. The AS 4 starting such a service corresponds to a service unit. This type of service unit can be actualized as the computer program executed on the CPU included in the AS 4.

Moreover, the even when the AS 4 does not perform the management, the AS 4 can intervene in the management of the parent session by transmitting and receiving the request and the response via the bypass route. Herein, the "intervention" implies that the AS 4 can grasp the transmission and the reception of the data, e.g., the Re-INVITE etc transferred and received under the management of the parent session. Accordingly, the AS 4 can, after grasping the situation of the parent session, provide the AS service and can determine the timing etc for providing the AS service more flexibly.

FIG. 9 illustrates a bypass route releasing process. This process can be executed by a processor of CSCF 3 by instructions of the computer program stored on a storage device of the CSCF 3. Depicted herein is a procedure in which the bypass route releasing process is carried out by a specified trigger in a status where the bypass route has already been established. Herein, the "specified trigger" is exemplified by a trigger such as a service changeover of transferring the session management back to the CSCF 3, and so forth. In an example in FIG. 9, the trigger is the timing when the CSCF 3 receives a character string "REQUEST" (an arrowhead S42). The character string such as this can be, according to the SIP, transmitted by use of a request "INFO" to the CSCF 3 from the terminal.

The CSCF 3 transmits the request "BYE" to the AS 4, which is triggered by receiving the character string "REQUEST" from one terminal, e.g., the mobile terminal 1A connected in the voice session (an arrowhead S43). This request "BYE" is a session release request on the uplink route extending toward the AS 4 from the CSCF 3.

As for this "BYE", the AS 4 at first transmits the request "BYE" to the CSCF 3 (an arrowhead S44). This request "BYE" from the AS 4 is a session release request on the downlink route extending toward the CSCF 3 from the AS 4. Then, in response to the session release request in the downlink direction, the CSCF 3 sends back the response "200 OK" (an arrowhead S45). The session on the downlink route is thereby released.

Then, the AS 4, upon receiving the response "200 OK", sends back the response "200 OK" in response to the session release request on the uplink route (the arrowhead S46). The session on the uplink route is thereby released, thus finishing the bypass route releasing process. At this time, the CSCF 3 deletes the definition of the released bypass route from the bypass route definition table. Further, the AS 4 deletes the definition of the released bypass route from the bypass route definition table. Then, "REQUEST" is sent from the CSCF 3 to the mobile terminal 2A (an arrowhead S47), then "RESPONSE" is sent back to the CSCF 3 from the mobile terminal 2A (an arrowhead S48), further, "RESPONSE" is sent from the CSCF 3 to the mobile terminal 2A (an arrowhead S47) without intervening of AS 4.

Note that in the example in FIG. 9, the bypass route is released by mutually transmitting and receiving the command "REQUEST" and the command "RESPONSE" to this request between the mobile terminal 1A on the outgoing side and the mobile terminal 2A on the incoming side by use of, e.g., the request "INFO". A substitute for this process may, however, be a process of releasing the bypass route in linkage with the release of the parent session.

FIG. 10 illustrates a structure of a bypass route table for defining the bypass route. This bypass route table is stored in the memory of each of the CSCF 3 and the AS 4. The bypass route has entries such as a "terminal on the outgoing side", a "terminal on the incoming side", a "downlink bypass route" and an "uplink bypass route" in each row.

The entry of the terminal on the outgoing side is stored with the SIP-URI of the terminal on the outgoing side of the session that should be bypassed to the AS 4 via the bypass route. Further, the entry of the terminal on the incoming side is stored with the SIP-URI of the terminal on the incoming side of the session that should be bypassed to the AS 4 via the bypass route.

Moreover, the entry of the uplink bypass route is stored with identifying information of the session used when forwarding the request or the response to the AS 4 from the CSCF 3. Further, the entry of the downlink bypass route is stored with the identifying information of the session used when forwarding the request or the response from the AS 4 to the CSCF 3.

In the example in FIG. 10, a downlink bypass route #N1 and an uplink bypass route #M1 are defined between the mobile terminals 1A, 2A. Still further, the downlink bypass route #N1 and the uplink bypass route #M1 are also defined between the image terminals 1B, 2B. Accordingly, in this definition, it follows that the request and the response in the voice session (parent session) between the mobile terminals 1A, 2A and the request and the response in the image session (child session) between the image terminals 1B, 2B are forwarded to the AS 4 from the CSCF 3 via the bypass routes.

The bypass route definition table is stored in the memory of the CSCF 3 and is employed for determining whether the request and the response is to forwarded via the bypass route or not when transmitting the request and the response. Namely, the CSCF 3, when receiving the request or the response, refers to the SIP-URI of the terminal on the outgoing side and the SIP-URI of the terminal on the incoming side from the SDP information thereof. Then, if a pair of SIP-URIs thereof is defined in the bypass route definition table, it is determined that the request or the response should be forwarded to the AS 4 via the bypass route.

Note that the bypass route is, when viewed from the AS 4, corresponds to (appears to be) the normal session. To be specific, when viewed from the AS 4, the CSCF 3 is recognized as one of the terminals receiving the SIP-based service, and hence the loop-back process may be executed.

As discussed above, the CSCF 3 and the AS 4 in the first embodiment transmit, as triggered by the startup of the specified service (e.g., when establishing the child session with respect to the parent session), the request "INVITE" to each other and receive the response "200 OK" from each other, thereby configuring the pair of bypass routes in the downlink/uplink directions.

The thus-configured bypass routes are saved in the bypass route definition table. Accordingly, for instance, when the request "Re-INVITE" is transmitted from the terminal to the CSCF 3 in the parent session, the CSCF 3 compares the SIP-URIs of the terminals on the outgoing side and the incoming side that are specified by the request "Re-INVITE" with the SIP-URIs of the terminals on the outgoing side and the incoming side in the bypass route definition table.

Then, if the bypass routes are defined for the terminals on the outgoing side and the incoming side, the CSCF 3 transmits the request to the AS 4 from the terminal on the outgoing side via the uplink bypass route. Further, the CSCF 3 transmits the response from the terminal on the incoming side to the AS 4 via the uplink bypass route. Similarly, the AS 4 sends the request and the response received via the uplink bypass route from the CSCF 3 back to the CSCF 3 via the downlink bypass route. Thus, it follows that the information of the parent session is propagated to between the CSCF 3 and the AS 4 via the bypass routes.

MODIFIED EXAMPLE

In the first embodiment, the bypass route definition table is stored with the pair of the terminal on the outgoing side and the terminal on the incoming side, in which the stored information is used as the identifying information of the parent session. In place of this structure, the bypass route definition table may also be stored with session identifying information (session ID) of the parent session. Then, for example, when the request "Re-INVITE" is transmitted to the CSCF 3 from the terminal in the parent session, the CSCF 3 may compare the session identifying information of the session when the request "Re-INVITE" is transmitted with the session identifying information defined in the bypass route definition table, and may determine whether the bypass route is defined in the session or not.

<<Second Embodiment>>

The communication system according to a second embodiment will hereinafter be described with reference to FIGS. 11 and 12. The first embodiment has discussed the communication system in which the bypass routes are configured, and the AS 4 intervenes in the management of the parent session. The second embodiment will discuss the communication system in which the parent session is again established, and the management of the parent session is transferred from the CSCF 3 (corresponding to a first server and a management device) to the AS 4 (corresponding to a second server, a server and a computer). Other configurations and operations are the same as those in the case of the first embodiment. Such being the case, the same components as those in the first embodiment are marked with the same numerals and symbols, and their descriptions are omitted. The components of the terminals and the servers included in the communication system are the same as those in the case of FIGS. 3 and 4.

FIGS. 11 and 12 are sequence diagrams of procedures for transferring the management of the parent session to the AS 4 from the CSCF 3. A start of the procedures is triggered by starting up a specified service when the mobile terminals 1A, 2A are connected to each other in an RTP session which is started based on the SIP (an arrowhead S60). The phrase "being triggered by starting up the specified service" is exemplified by a case where the child session with the RTP session serving as the parent session is established, and so on.

In the second embodiment, with the trigger of the service startup such as this, the AS 4 instructs the CSCF 3 to start transferring process. Specifically, in the communication system, the AS 4 detects the trigger that the service may be started up, and starts up the sequence of transferring the management of the parent session. Transferring a management of a session may be called session re-establishment.

The AS 4 detecting the trigger such as this corresponds to a detecting unit. This type of detecting unit can be realized as the computer program executed on the CPU included in the AS 4 (the same will hereinafter be applied).

The forwarding is started by transmitting the request "REFER" to the CSCF 3 from the AS 4. In the communication system, the CSCF 3 starts up a session re-establishing sequence by receiving the REFER.

The REFER contains designation of the SIP-URI of the AS 4 as a transferring destination. The CSCF 3 transmits the received REFER to one terminal, e.g., the mobile terminal 1A connected in the parent session (an arrowhead S61). The AS 4 executing this process corresponds to a first request unit.

Then, the mobile terminal 1A sends back a response "202" (202 Accepted) (an arrowhead S62). This acknowledgement is a response of confirmation that the REFER has been accepted. Further, the mobile terminal 1A transmits, to the CSCF 3, the INVITE attached with the SIP-URIs for specifying an IP address and a port number of the self-device (an arrowhead S62). This INVITE is forwarded to the AS 4 from the CSCF 3. The AS 4 receiving this INVITE corresponds to a first receiving unit.

The AS 4, upon receiving the forwarded INVITE, sends back the response "200 OK". The AS 4 executing this process corresponds to a first responding unit. In this response "200 OK", the SDP information such as the SIP-URI is not designated but is a dummy. Namely, in this response "200 OK", the responder is set in the dummy. The responder dummy has a meaning of not having the designation of the SIP-URI of one terminal configuring an end-to-end connection in the SDP-based session. In this case, however, the AS 4 is set as the sender of the response "200 OK" itself.

The session re-establishing sequence has already been started up, and therefore the CSCF 3 forwards the received response to the mobile terminal 1A according to this re-establishing sequence (an arrowhead S64). As a result, a dummy RTP session is established between the mobile terminal 1A and the AS 4 (an arrowhead S65). The AS 4 establishing this dummy RTP session corresponds to a first establishing unit.

Furthermore, the mobile terminal 1A transmits a request "NOTIFY" in order to notify of the establishment of the RTP session (an arrowhead S66). This "NOTIFY" is forwarded to the AS 4 via the CSCF 3. The "NOTIFY" is notification saying that the transfer of the RTP session has been completed through the REFER. Then, the AS 4 sends back the response "200 OK". This response "200 OK" is forwarded to the mobile terminal 1A via the CSCF 3. This response "200 OK" is the acknowledgement of receiving the NOTIFY.

Moreover, according to the session re-establishing sequence, the AS 4 instructs the other mobile terminal 2A to start forwarding (arrowheads S68-S74). The procedures are the same as S61-S67, and hence the in-depth description thereof is omitted. As a result, the dummy RTP session is set up between the mobile terminal 2A and the AS 4 (arrowheads S72-S74). Similarly, the AS 4 transmitting the REFER in S72 corresponds to a second requesting unit, the AS 4 receiving the INVITE in S69 corresponds to a second receiving unit, the AS 4 transmitting the 200 OK in S72 corresponds to a second responding unit, and the AS 4 establishing the session in S72 corresponds to a second establishing unit.

FIG. 12 illustrates the session re-establishing sequence that is further continuously executed by the AS 4. To be specific, the AS 4 transmits the INVITE with no designation of the sender to the mobile terminal 1A on the outgoing side via the CSCF 3 (an arrowhead S80). The AS 4 transmitting this INVITE corresponds to a third requesting unit. The mobile terminal 1A receiving the INVITE sends back the response "200 OK" via the CSCF 3 in a way that designates the SIP-URI of the mobile terminal 1A as the responder (an arrowhead S81). The AS 4 receiving this response corresponds to a third receiving unit. At this time, the AS 4 acquires the SDP information of the mobile terminal 1A defined as the responder from the response "200 OK". The AS 4 acquiring this SDP information corresponds to an acquiring unit.

Then, the AS 4 specifies, in the responder, the SDP information of the responder that is obtained through the response "200 OK" and transmits the INVITE to the other mobile terminal 2A (an arrowhead S82). The AS executing this process corresponds to a fourth requesting unit. This INVITE is transmitted via the CSCF 3 to the mobile terminal 2A on the incoming side.

Thereupon, the mobile terminal 2A specifies the self-terminal, i.e., the SDP information on the incoming side and sends back the response "200 OK". This response is forwarded via the CSCF 3 to the AS 4 (an arrowhead S83).

Further, the AS 4 transmits a request "ACK" to the mobile terminal 1A on the outgoing side via the CSCF 3, and checks the establishment of the session (an arrowhead S84). This ACK contains, as the sender, designation of the SDP information of the mobile terminal 2A on the incoming side.

Similarly, the AS 4 transmits the ACK to the mobile terminal 2A on the incoming side through the CSCF 3, and checks the establishment of the session (an arrowhead S85). This ACK contains, as the sender, the designation of the SDP information of the mobile terminal 1A on the outgoing side.

As a result of the above, the RTP session is re-established between the mobile terminal 1A on the outgoing side and the mobile terminal 2A on the incoming side, and the session management thereof is transferred to the AS 4. To be specific, the AS 4 participates in transferring and receiving the Re-INVITE between the mobile terminal 1A on the outgoing side and the mobile terminal 2A on the incoming side. The AS 4 executing the management of the voice session between the mobile terminals 1A, 2A corresponds to a management unit. On the other hand, the CSCF 3 functions as the relay device between the mobile terminals 1A, 2A and the AS 4.

MODIFIED EXAMPLE

In the second embodiment, the dummy RTP session (a first dummy session, refer to the arrowhead S65 in FIG. 11) is temporarily established between the AS 4 and the mobile terminal 1A on the outgoing side, and further the dummy RTP session (a second dummy session, refer to S72 in FIG. 11) is established between the AS 4 and the mobile terminal 2A on the incoming side. Then, thereafter, the AS 4 transmits the INVITE with no designation of the sender to one (outgoing side) mobile terminal 1A via the CSCF 3 (refer to S80 in FIG. 12). Subsequently, the SDP information of the mobile terminal 1A on the outgoing side is acquired from the response "200 OK" thereof. Further, the request "INVITE" is transmitted based on the acquired SDP information to the other (incoming side) mobile terminal 2A (refer to S82 in FIG. 12), thus establishing the RTP session (refer to S86 in FIG. 12).

A processing procedure may, however, be taken, which does not use the second dummy session in the dummy RTP sessions described above. For instance, on the occasion of establishing the first dummy session, the AS 4 has already acquired the SDP information of the mobile terminal 1A through the INVITE (refer to S63 in FIG. 11) sent from the mobile terminal 1A on the outgoing side with respect to the REFER. Accordingly, this SDP information may be used as it is, and, without establishing the second dummy session, the RTP session may be established between the mobile terminals 1A, 2A.

Figure 13:
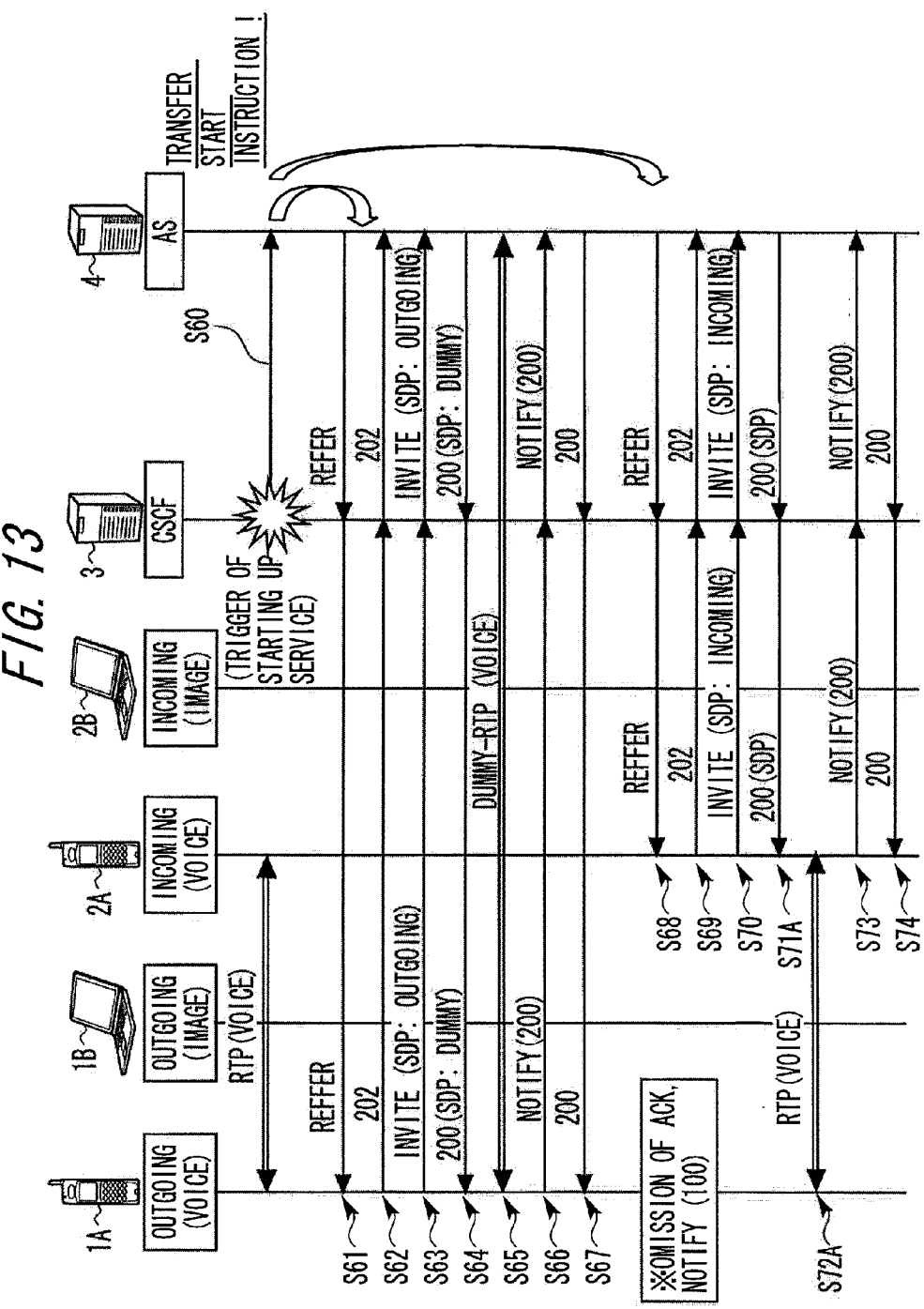
FIG. 13 is a sequence diagram illustrating a modified example of the procedure of transferring the management of the parent session to the AS from the CSCF.

FIG. 13 illustrates a procedure for establishing the RTP session between the mobile terminals 1A, 2A without establishing the second dummy session. In this procedure, the arrowheads S61-S70 are the same as in the case of FIG. 11.

With respect to the REFER sent to the mobile terminal 2A on the incoming side (the arrowhead S68), the mobile terminal 2A transmits the INVITE to the AS 4 via the CSCF 3. In response to this INVITE, the AS 4 may send back the response "200 OK" in a way that attaches the SDP information of the mobile terminal 1A on the outgoing side. The AS 4 sending back this response corresponds to a third responding unit.

This response "200 OK" is transmitted to the mobile terminal 2A via the CSCF 3, and the RTP session is established between the mobile terminals 1A, 2A (an arrowhead S72A). Hereafter, the AS 4 manages the session between the mobile terminals 1A, 2A. Further, the AS 4 provides the image service to the image terminals 1B, 2B.

Since the procedure in FIG. 13 is adopted, the session management can be transferred from the CSCF 3 to the AS 4 in the simpler procedures than in the case of FIGS. 11 and 12 in the second embodiment. It may, however, be determined from intricacy, stability, etc of the system which procedure(s), the procedures in FIGS. 11 and 12 or the procedure in FIG. 13, may be adopted.

Moreover, in the second embodiment, the voice session is established between the mobile terminals 1A, 2A, and the image session associated with the voice session is established between the image terminals 1B, 2B. In place of this configuration, however, both of the voice session and the image session may also be established between a pair of terminals. Namely, the voice session and the image session associated with this voice session may be established between the mobile terminals 1A, 2A. Furthermore, the voice session and the image session associated with this voice session may be established between the image terminals 1B, 2B.

<<Readable-by-Computer Recording Medium>>

A program for making a computer, other machines and devices (which will hereinafter be referred to as the computer etc) realize any one of the functions can be recorded on a recording medium readable by the computer etc. Then, the computer etc is made to read and execute the program on this recording medium, whereby the function thereof can be provided.

Namely, the program executed by the CPU of the CSCF 3 may be recorded on the recording medium which can be read by the computer etc, then loaded into the CSCF 3 and executed. Further, the program executed by the CPU of the AS 4 may be recorded on the recording medium which can be read by the computer etc, then loaded into the AS4 and executed.

Herein, the recording medium readable by the computer etc connotes a recording medium capable of storing information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, BD-Ray, a DAT, an 8 mm tape, a memory card, etc are given as those removable from the computer.

Further, a hard disc, a ROM (Read-Only Memory), etc are given as the recording mediums fixed within the computer etc.

According to the embodiment, there is realized the linkage between CSCF 3 managing the session status in the communication between the mobile terminals and AS4 providing the service about the communication between these mobile terminals or between image terminals associated with the mobile terminals.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A communication method in a system comprising:
a first server to manage a first communication between a first terminal and a second terminal; and
a second server to provide a service related to a second communication associated with the first communication between the first terminal and the second terminal or between a third terminal related to the first terminal and a fourth terminal related to the second terminal,
the first server executing:
detecting a condition under which the service related to the second communication associated with the first communication is started up;

establishing a connection with the second server upon detecting the condition; and relaying data about the first communication between any of the first and second terminals and the second server through the established connection;

the second server executing:

receiving the data about the first communication from the first server through the established connection and sending the data back to the first server; and providing the service related to the second communication through the established connection.

2. A communication method according to claim 1, wherein the first server further executes relaying the data about the second communication between any of the first and second terminals and the second server or between the third and fourth terminals and the second server through the established connection.

3. A communication method according to claim 1, wherein the first server executes stopping management of the first communication upon establishing the connection, and the second server executes starting the management of the first communication as triggered by establishing the connection.

4. A communication method according to claim 1, wherein at least one tuple of a tuple of the first terminal and the second terminal and a tuple of the third terminal and the fourth terminal is a tuple of the same terminals.

5. A communication method by which a second server providing, in a way that links up with a first server managing a first communication between a first terminal and a second terminal, a service related to a second communication associated with the first communication between the first terminal and second terminal or between a third terminal related to the first terminal and a fourth terminal related to the second terminal, executes:

detecting a condition under which the service related to the second communication associated with the first communication is started up;

transmitting to the first terminal via the first server, upon detecting the condition, a transfer request for transferring management of the first communication to the second server from the first server;

receiving, after the transfer request, a request for a connection of the first communication via the first server from the first terminal;

making a response to the request for the connection of the first communication from the first terminal without specifying a connection responder;

establishing a temporary connection based on the first communication between the first terminal and the second server upon finishing the response to the connection request given from the first terminal;

transmitting to the second terminal via the first server, upon detecting the condition, a transfer request for transferring the management of the first communication to the second server from the first server;

receiving, after the transfer request, the request for the connection of the first communication via the first server from the second terminal;

making a response to the request for the connection of the first communication from the second terminal without specifying a connection responder;

establishing a temporary connection based on the first communication between the second terminal and the second server upon finishing the response to the connection request given from the second terminal;

transmitting a first connection request to the first terminal via the first server without specifying a connection requester;

receiving a response to the first connection request from the first terminal via the first server;

acquiring information of a connecting destination of the first terminal from the received response;

transmitting a second connection request with the first terminal specified as a connection requester to the second terminal by use of the information of the connecting destination of the first terminal;

starting the management of the first communication after receiving the response to the second connection request; and releasing the temporary connection based on the first communication between the first terminal and the second server and the temporary connection based on the first communication between the second terminal and the second server.

6. A communication method by which a second server providing, in a way that links up with a first server managing a first communication between a first terminal and a second terminal, a service related to a second communication associated with the first communication between the first terminal and second terminal or between a third terminal related to the first terminal and a fourth terminal related to the second terminal, executes:

detecting a condition under which the service related to the second communication associated with the first communication is started up;

transmitting to the first terminal via the first server, upon detecting the condition, a transfer request for transferring management of the first communication to the second server from the first server;

receiving, after the transfer request, a request for a connection of the first communication via the first server from the first terminal;

making a response to the request for the connection of the first communication from the first terminal without specifying a connection responder;

establishing a temporary connection based on the first communication between the first terminal and the second server when finishing the response to the connection request;

transmitting to the second terminal via the first server, upon detecting the condition, a transfer request for transferring the management of the first communication to the second server from the first server;

receiving, after the transfer request, the request for the connection of the first communication via the first server from the second terminal;

making a response to the request for the connection of the first communication from the second terminal with the first terminal specified as a connection responder by use of information of the connecting destination of the first terminal in the temporary connection;

starting the management of the first communication upon finishing the response with the first terminal specified as the connection responder to the connection request given from the second terminal; and releasing the temporary connection based on the first communication between the first terminal and the second server.

7. A communication system comprising:

a first server to manage a first communication between a first terminal and a second terminal; and a second server to provide a service related to a second communication associated with the first communication between the first terminal and the second terminal or between a third terminal related to the first terminal and a fourth terminal related to the second terminal,
the first server including:
a detecting unit to detect a condition under which the service related to the second communication associated with the first communication is started up;
an establishing unit to establish a connection with the second server upon detecting the condition; and
a relay unit to relay data about the first communication between any of the first and second terminals and the second server through the established connection;
the second server including:
a loop-back unit to receive the data about the first communication from the first server through the established connection and sending the data back to the first server; and
a service unit to provide a service based on the second communication through the established connection.

8. A communication system according to claim 7, wherein the relay unit relays the data about the second communication between any of the first and second terminals and the second server or between any of the third and fourth terminals and the second server through the established connection.

9. A communication system according to claim 7, wherein the first server includes a stopping unit to stop management of the first communication as upon establishing the connection, and
the second server includes a starting unit to start the management of the first communication upon establishing the connection.

10. A communication system according to claim 7, wherein at least one tuple of a tuple of the first terminal and the second terminal and a tuple of the third terminal and the fourth terminal is a tuple of the same terminals.

11. A server providing, in a way that links up with a management device managing a first communication between a first terminal and a second terminal, a service related to a second communication associated with the first communication between the first terminal and second terminal or between a third terminal related to the first terminal and a fourth terminal related to the second terminal, the server comprising:
a detecting unit to detect a condition under which the service related to the second communication associated with the first communication is started up;
a first requesting unit to transmit to the first terminal via the management device, upon detecting the condition, a transfer request for transferring management of the first communication to the server from the management device;
a first receiving unit to receive, after the transfer request, a request for a connection of the first communication via the management device from the first terminal;
a first responding unit to make a response to the request for the connection of the first communication from the first terminal without specifying a connection responder;
a first establishing unit to establish a temporary connection based on the first communication between the first terminal and the server upon finishing the response to the connection request given from the first terminal;
a second requesting unit to transmit to the second terminal via the management device, upon detecting the condition, a transfer request for transferring the management of the first communication to the server from the management device;
a second receiving unit to receive, after the transfer request, a request for the connection of the first communication via the management device from the second terminal;
a second responding unit to make a response to the request for the connection of the first communication from the second terminal without specifying a connection responder;
a second establishing unit to establish a temporary connection based on the first communication between the second terminal and the server upon finishing the response to the connection request given from the second terminal;
a third requesting unit to transmit a connection request to the first terminal via the management device without specifying a connection requester;
a third receiving unit to receive a response to the connection request to the first terminal from the first terminal via the management device;
an acquiring unit to acquire information of a connecting destination of the first terminal from the received response;
a fourth requesting unit to transmit a connection request with the first terminal specified as a connection requester to the second terminal by use of the information of the connecting destination of the first terminal;
a management unit to start the management of the first communication after receiving the response to the second connection request; and
a releasing unit to release the temporary connection based on the first communication between the first terminal and the second server and the temporary connection based on the first communication between the second terminal and the second server.

12. A server according to claim 11, wherein at least one tuple of a tuple of the first terminal and the second terminal and a tuple of the third terminal and the fourth terminal is a tuple of the same terminals.

13. A server providing, in a way that links up with a management device managing a first communication between a first terminal and a second terminal, a service related to a second communication associated with the first communication between the first terminal and second terminal or between a third terminal related to the first terminal and a fourth terminal related to the second terminal, the server comprising:
a detecting unit to detect a condition under which the service related to the second communication associated with the first communication is started up;
a first requesting unit to transmit to the first terminal via the management device, upon detecting the condition, a transfer request for transferring management of the first communication to the server from the management device;
a first receiving unit to receive, after the transfer request, a request for a connection of the first communication via the management device from the first terminal;
a first responding unit to make a response to the request for the connection of the first communication from the first terminal without specifying a connection responder;
an establishing unit to establish a temporary connection based on the first communication between the first terminal and the server upon finishing the response to the connection request given from the first terminal;

a second requesting unit to transmit to the second terminal via the management device, upon detecting the condition, a transfer request for transferring the management of the first communication to the self server from the management device;

a second receiving unit to receive, after the transfer request, a request for the connection of the first communication via the management device from the second terminal;

a third responding unit to make a response to the request for the connection of the first communication from the second terminal with the first terminal specified as a connection responder by use of the information of the connecting destination of the first terminal in the temporary connection;

a management unit to start the management of the first communication upon finishing the response with the first terminal specified as the connection responder to the connection request given from the second terminal; and a releasing unit to release the temporary connection based on the first communication between the first terminal and the server.

14. A non-transitory storage medium storing executable instructions of a computer program that, when executed by a computer, causes the computer to link up with a management device managing a first communication between a first terminal and a second terminal, and provide a service related to a second communication associated with the first communication between the first terminal and second terminal or between a third terminal related to the first terminal and a fourth terminal related to the second terminal, the instructions causing the computer to execute:

detecting a condition under which the service related to the second communication associated with the first communication is started up;

transmitting to the first terminal via the management device, upon detecting the condition, a transfer request for transferring management of the first communication to the computer from the management device;

receiving, after the transfer request, a request for a connection of the first communication via the management device from the first terminal;

making a response to the request for the connection of the first communication from the first terminal without specifying a connection responder;

establishing a temporary connection based on the first communication between the first terminal and the computer upon finishing the response to the connection request;

transmitting to the second terminal via the management device, upon detecting the condition, a transfer request for transferring the management of the first communication to the computer from the management device;

receiving, after the transfer request, a request for the connection of the first communication via the management device from the second terminal;

making a response to the request for the connection of the first communication from the second terminal without specifying a connection responder;

establishing a temporary connection based on the first communication between the second terminal and the computer upon finishing the response to the connection request;

transmitting a connection request to the first terminal via the management device without specifying a connection requester;

receiving a response to the connection request from the first terminal via the management device;

acquiring information of a connecting destination of the first terminal from the received response;

transmitting a connection request with the first terminal specifying as a connection requester to the second terminal by use of the information of the connecting destination of the first terminal;

starting the management of the first communication after receiving the response to the connection request from the second terminal; and releasing the temporary connection based on the first communication between the first terminal and the computer and the temporary connection based on the first communication between the second terminal and the computer.

15. A non-transitory storage medium storing executable instructions of a computer program that, when executed by a computer, causes the computer to link up with a management device managing a first communication between a first terminal and a second terminal, provide a service related to a second communication associated with the first communication between the first terminal and second terminal or between a third terminal related to the first terminal and a fourth terminal related to the second terminal, the instructions causing the computer to execute:

detecting a condition under which the service related to the second communication associated with the first communication is started up;

transmitting to the first terminal via the management device, upon detecting the condition, a transfer request for transferring management of the first communication to the computer from the management device;

receiving, after the transfer request, a request for a connection of the first communication via the management device from the first terminal;

making a response to the request for the connection of the first communication from the first terminal without specifying a connection responder;

establishing a temporary connection based on the first communication between the first terminal and the computer upon finishing the response to the connection request given from the first terminal;

transmitting to the second terminal via the management device, upon detecting the condition, a transfer request for transferring the management of the first communication to the computer from the management device;

receiving, after the transfer request, the request for the connection of the first communication via the management device from the second terminal;

making a response to the request for the connection of the first communication from the second terminal with the first terminal specified as a connection responder by use of information of the connecting destination of the first terminal in the temporary connection;

starting the management of the first communication upon finishing the response with the first terminal specified as the connection responder to the connection request given from the second terminal; and releasing the temporary connection based on the first communication between the first terminal and the computer.

* * * * *